(12) United States Patent
Majkrzak

(10) Patent No.: US 11,026,442 B2
(45) Date of Patent: Jun. 8, 2021

(54) ANIMAL FEED

(71) Applicant: Red River Commodities, Inc., Fargo, ND (US)

(72) Inventor: Robert Majkrzak, West Fargo, ND (US)

(73) Assignee: RED RIVER COMMODITIES, INC., Fargo, ND (US)

( * ) Notice: Subject to any disclaimer, the term of this patent is extended or adjusted under 35 U.S.C. 154(b) by 173 days.

(21) Appl. No.: 16/103,152

(22) Filed: Aug. 14, 2018

(65) Prior Publication Data

US 2019/0059426 A1 Feb. 28, 2019

Related U.S. Application Data

(60) Provisional application No. 62/550,390, filed on Aug. 25, 2017.

(51) Int. Cl.
  *A01K 39/00* (2006.01)
  *A23L 25/00* (2016.01)
  (Continued)

(52) U.S. Cl.
  CPC .............. *A23L 25/30* (2016.08); *A23K 10/12* (2016.05); *A23K 10/20* (2016.05); *A23K 10/30* (2016.05);
  (Continued)

(58) Field of Classification Search
  CPC ................ A01K 39/00; A01K 39/0106; A01K 39/0125; A23L 25/00
  (Continued)

(56) References Cited

U.S. PATENT DOCUMENTS 4,691,665 A * 9/1987 Hefner ................ A01K 39/012
119/57.8
4,803,085 A 2/1989 Findley
(Continued)

FOREIGN PATENT DOCUMENTS

| CN | 101773197 A | 7/2010 |
|---|---|---|
| EP | 1 815 751 A1 | 8/2007 |
| GB | 2 513 548 A | 11/2014 |

OTHER PUBLICATIONS

"Peanut Butter for Birds—With Mealworms" CJ WildBird Foods Ltd, Web page [online]. [retrieved on Feb. 19, 2019] Retrieved from the Internet: <URL: https://www.birdfood.co.uk/peanut-butter-for-birds-with-mealworms.html>. Available at least as early as Jun. 2017; 2 pages.
(Continued)

*Primary Examiner* — Richard T Price, Jr.
(74) *Attorney, Agent, or Firm* — Mueting Raasch Group

(57) ABSTRACT

An animal feed product disclosed herein has a feed mixture disposed in a container, where the feed mixture has a plurality of animal feed particles and seed butter coating each of the animal feed particles. A removable cover is coupled to the container over the cavity to encase the feed mixture. A method disclosed herein relates to heating a seed butter to reduce its viscosity. Animal feed particles are translated through a spraying region and each of the animal feed particles are coated with the heated seed butter to form a seed mixture. The seed mixture is deposited in a container defining a cavity and the feed mixture is compressed in the cavity. Other embodiments are described.

20 Claims, 3 Drawing Sheets

(51) Int. Cl.
  *A23K 10/30* (2016.01)
  *A23K 10/12* (2016.01)
  *A23K 30/12* (2016.01)
  *A23L 25/10* (2016.01)
  *A23K 40/30* (2016.01)
  *A23K 10/20* (2016.01)
  *A23K 50/70* (2016.01)
  *A23K 20/158* (2016.01)
  *A23K 40/20* (2016.01)

(52) U.S. Cl.
  CPC ............ *A23K 20/158* (2016.05); *A23K 30/12* (2016.05); *A23K 40/20* (2016.05); *A23K 40/30* (2016.05); *A23K 50/70* (2016.05); *A23L 25/10* (2016.08); *A23V 2002/00* (2013.01); *A23V 2250/21* (2013.01); *A23V 2250/5488* (2013.01); *A23V 2300/10* (2013.01)

(58) Field of Classification Search
  USPC .................................................. 119/174, 900
  See application file for complete search history.

(56) References Cited

U.S. PATENT DOCUMENTS

| | | | |
|---|---|---|---|
| 5,052,342 | A | 10/1991 | Schneider |
| 5,270,064 | A | 12/1993 | Shultz |
| 5,363,754 | A | 11/1994 | Coles et al. |
| 5,758,596 | A * | 6/1998 | Loiselle ............... A01K 39/014 119/52.2 |
| 5,879,696 | A | 3/1999 | Blumberg |
| 6,047,661 | A * | 4/2000 | Lush ................... A01K 39/0106 119/51.01 |
| 6,073,582 | A * | 6/2000 | Lush ................... A01K 39/0106 119/51.01 |
| 6,427,629 | B1 * | 8/2002 | Lush ..................... A01K 5/0225 119/459 |
| 6,777,019 | B1 | 8/2004 | Thornberg |
| 6,866,004 | B1 * | 3/2005 | Lush .................... A01K 39/012 119/52.1 |
| 7,032,538 | B1 * | 4/2006 | Lush .................... A01K 39/012 119/459 |
| 7,185,605 | B1 * | 3/2007 | Lush ..................... A01K 5/0225 119/52.1 |
| 7,481,180 | B1 * | 1/2009 | Snipes, Jr. ........... A01K 5/0233 119/410 |
| 7,503,282 | B1 * | 3/2009 | Lush ..................... A01K 5/0225 119/52.2 |
| 7,685,967 | B2 | 3/2010 | Hoogland |
| 8,148,651 | B1 * | 4/2012 | Coppola .............. A01K 5/0114 177/25.16 |
| 8,245,666 | B2 * | 8/2012 | Sena .................... A01K 39/012 119/57.8 |
| 2002/0168462 | A1 | 11/2002 | Jefferson |
| 2003/0041516 | A1 | 3/2003 | Cook |
| 2009/0235812 | A1 * | 9/2009 | Garwood .................. F41A 9/36 89/33.01 |
| 2010/0012041 | A1 * | 1/2010 | Wechsler ............. A01K 39/012 119/52.4 |
| 2011/0088634 | A1 * | 4/2011 | Shirley ................ A01K 15/025 119/708 |
| 2012/0079987 | A1 * | 4/2012 | Lush .................... A01K 39/012 119/65 |
| 2012/0315362 | A1 | 12/2012 | Dale et al. |
| 2013/0104810 | A1 * | 5/2013 | Haakansson ........... A23K 40/20 119/710 |
| 2013/0171291 | A1 | 7/2013 | White et al. |
| 2016/0058035 | A1 | 3/2016 | McWilliams et al. |
| 2016/0066599 | A1 | 3/2016 | McWilliams et al. |
| 2017/0049139 | A1 | 2/2017 | Tsutsumi et al. |

OTHER PUBLICATIONS

"SunButter Bird Feeder Craft" SunButter®, Web page from SunButter® blog [online]. [retrieved on Feb. 19, 2019] Retrieved from the Internet: <https://sunbutter.com/sunbutter-bird-feeder-craft/> Apr. 18, 2015; 3 pages.

Audubon, "Bird-Feeding Tips: Follow these tips to attract the most feathered friends to your feeders" Written by Steve Kress [online]. [retrieved on Feb. 19, 2019] Retrieved from the Internet: <https://www.audubon.org/news/bird-feeding-tips> Sep. 27, 2011; 9 pages.

Audubon, "Make Your Own Suet: With this easy vegetarian recipe, you can attract insect lovers like woodpeckers and nuthatches" Written by Avery Cullinan [online]. [retrieved on Feb. 19, 2019] Retrieved from the Internet: <https://www.audubon.org/news/make-your-own-suet> Nov. 28, 2016; 9 pages.

Valley Splendor®, "Mealworm Cakes" Product Page [online]. [retrieved on Feb. 19, 2019] Retrieved from the Internet: <https://valleysplendor.com/content/mealworm-cakes> Copyright 2017; 2 pages.

Pine Tree Farms, "Mealworm Banquet Large Seed Cake" Parrotcha Order Page [online]. [retrieved on Feb. 19, 2019] Retrieved from the Internet: <https://www.parrotcha.com/products/mealworm-banquet-large-seed-cake?variant=44905274691&utm_campaign=gs-2018-12-19&utm_source=google&utm_medium=smart_campaign&gclid=EAIaIQobChMI2LO_8dfI4AIVGUsNCh21QgdXEAQYASABEgKP4_D_BwE> Available at least as early as Jun. 2017; 3 pages.

"DIY: Peanut Butter 'Suet' Cakes for Birds" Web page from Wit & Whistle blog [online]. [retrieved on Feb. 19, 2019] Retrieved from the Internet: <https://witandwhistle.com/2010/03/04/diy-peanut-butter-suet-cake-for-birds/> Mar. 4, 2010; 7 pages.

"Peanut Butter Bird Feeder" Web page on Instructables.com posted by whiskey_14 [online]. [retrieved on Feb. 21, 2019] Retrieved from the Internet: <https://www.instructables.com/id/peanut-butter-bird-feeder/> Believed available as early as 2010; 11 pages.

Screen captures from YouTube video clip entitled "APEC 20 TMX Fat Coater MIX 10743 test run by Continental Agra" 3 pages, uploaded on Dec. 18, 2013 by user "ContinentalAgra". Retrieved from Internet: <https://www.youtube.com/watch?v=vH5hiBCKATM>.

\* cited by examiner

320

322 — translate animal feed particles through spraying region

324 — spraying animal feed particles with seed butter

326 — mixing feed mixture

FIG. 4

ANIMAL FEED

This application claims the benefit of U.S. Provisional Application No. 62/550,390, filed Aug. 25, 2017, the contents of which are herein incorporated by reference.

FIELD OF THE TECHNOLOGY

The technology disclosed herein generally relates to animal feed. More particularly, the technology disclosed herein related to an animal feed products and methods.

BACKGROUND

The wild and domestic animal feed industry has evolved to provide foods that can diverge from the natural or preferred diets of the target animals. For example, various types of bird feed incorporates a binding agent to prevent the particulates, such as seeds and insects, from dispersing in response to environmental elements such as rain and wind. Some bird feed incorporates gelatin as a binding agent to bind seeds (and other constituents) together, even though gelatin is not a natural food for wild or domesticated birds. Furthermore, the use of gelatin can slow down the manufacturing process for such feed because many hours are needed to wait for the gelatin in the product to dry. And within that drying period, water has hydrated the otherwise dehydrated constituents, which can become a breeding ground for contamination like bacteria and insects.

Some other types of animal feed incorporate suet as a binding agent for seed and other constituents. Suet is rendered fat that is frequently from cattle, and is not necessarily a desirable ingredient for some animals to consume at least in part because of its high fat content and low nutritional value.

SUMMARY

Some embodiments of the current technology relate to an animal feed product. The animal feed product has a container defining a cavity. A feed mixture is disposed in the cavity. The feed mixture is a plurality of animal feed particles and seed butter coating each of the plurality of animal feed particles. The animal feed particles is at least a plurality of seeds. The seed butter coating each of the plurality of animal feed particles is no more than 20% of the feed mixture by weight. A removable cover is coupled to the container over the cavity to encase the feed mixture.

In some embodiments, the animal feed particles also include a plurality of dehydrated invertebrates and/or a plurality of dehydrated insects. The plurality of dehydrated invertebrates can include mealworms and/or black soldier fly larvae. Additionally or alternatively, the plurality of seeds can include sunflower, grain, legume, and/or grass seeds. Additionally or alternatively, the seed butter includes sunflower seed butter. Additionally or alternatively, the seed butter contains peanuts, tree nuts, soybeans and/or pulses. Additionally or alternatively, the container is paper. Additionally or alternatively, the removable cover is a heat-shrink film coupled to the container with adhesive about the cavity. Additionally or alternatively, the seed butter is no more than 15% of the feed mixture by weight. Additionally or alternatively, the plurality of seeds includes whole seeds and/or partial seeds. Additionally or alternatively, the animal feed particles include dehydrated vegetables, dehydrated fruit, and/or dehydrated herbs. Additionally or alternatively, the seed butter has 30% to 55% fat content.

Some embodiments of the current technology are directed to a method. Seed butter is heated, which results in the viscosity of the seed butter being reduced. Animal feed particles are translated through a spraying region, and the animal feed particles are sprayed with the heated seed butter in the spraying region, thereby coating each of the animal feed particles with the seed butter. The animal feed particles coated with seed butter form a feed mixture. The feed mixture is deposited into a container defining a cavity and the feed mixture is compressed in the cavity.

In some embodiments, the feed mixture is mixed before depositing the feed mixture in the container. Additionally or alternatively, compressing the feed mixture in the container includes applying a pressure of no more than 10 psi. Additionally or alternatively, a removable cover can be adhered to the container about the cavity to encase the feed mixture. Additionally or alternatively, the animal feed particles can include a plurality of seeds. Additionally or alternatively, the plurality of seeds can include at least one type of seed including sunflower, grain, legume, and/or grass seeds. Additionally or alternatively, the animal feed particles includes a plurality of dehydrated invertebrates and/or a plurality of dehydrated insects. Additionally or alternatively, the invertebrates can include mealworms and/or black soldier fly larvae. Additionally or alternatively the seed butter is no more than 20% of the feed mixture by weight. Additionally or alternatively, the seed butter has 30% to 55% fat content. Additionally or alternatively, the animal feed particles include dehydrated vegetables, dehydrated fruit, and/or dehydrated herbs.

BRIEF DESCRIPTION OF THE DRAWINGS

FIG. 4 depicts an example flow chart of an example coating method consistent with technology disclosed herein.

The current technology may be more completely understood and appreciated in consideration of the following detailed description of various embodiments of the current technology in connection with the accompanying drawings.

DETAILED DESCRIPTION

Figure 1:
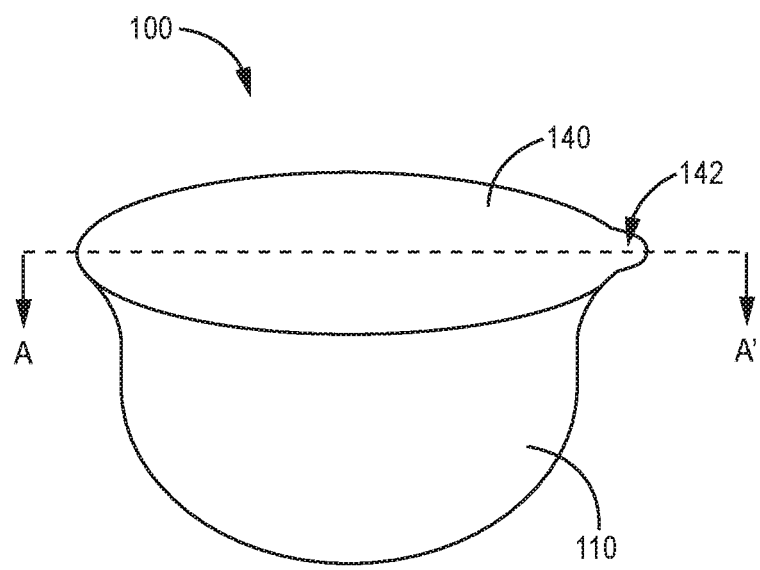
FIG. 1 depicts a perspective view of an example animal feed product consistent with embodiments of the technology disclosed herein.
Figure 2:
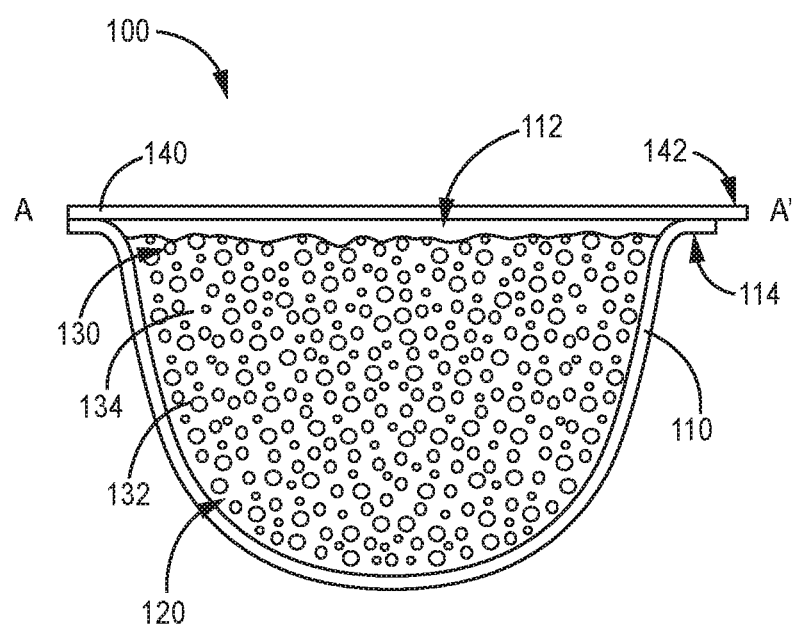
FIG. 2 depicts a cross-sectional view of the example of FIG. 1.

FIG. 1 depicts a perspective view of one example animal feed product 100 consistent with the technology disclosed herein, and FIG. 2 depicts a cross-sectional view of the animal feed product depicted in FIG. 1. The animal feed product 100 generally has a container 110 defining a cavity 120, a feed mixture 130 disposed in the cavity 120, and a removable cover 140 coupled to the container 110 over the cavity 120 to encase the feed mixture 130.

The feed mixture 130 generally is a plurality of animal feed particles 132 and a seed butter 134 coating each of the plurality of animal feed particles 132. The animal feed particles 132 are generally particles of food for a particular animal, such as birds. The animal feed particles 132 can have a number of different constituents, but generally will at least have a plurality of seeds. The plurality of seeds can be whole seeds and/or partial seeds. In some embodiments the plurality of seeds is a mixture of whole seeds and partial seeds. The plurality of seeds can have kernels, shells and/or partial kernels and shells. A variety of types of seeds can be included in the animal feed particles such as sunflower seeds, cereals, pseudocereals, grains, legumes, grasses, and the like.

The animal feed particles 132 of the feed mixture 130 can also have additional constituents that are consistent with the diet of the particular animal to be fed. In some embodiments the animal feed particles 132 has a plurality of dehydrated invertebrates and/or a plurality of dehydrated insects. The plurality of dehydrated invertebrates can be mealworms, black soldier fly larvae, and/or other types of worms or larvae in various embodiments. The plurality of dehydrated insects can be grasshoppers, crickets, beetles, and/or flies, as examples. Further, in some embodiments the animal feed particles 132 can have dehydrated vegetables, dehydrated fruit, and/or dehydrated herbs. In some embodiments, the animal feed particles can include grit, such as shell grit.

The term "dehydrated" is used herein to refer to moisture having been removed from the referenced product, and should not be interpreted as limiting the particular method used to remove the moisture. Generally the moisture content of each of the types of particles in the animal feed particles 132 will be sufficiently low to be rendered shelf stable for at least a year. The type of particle will generally dictate the maximum acceptable moisture content. For example, each type of dehydrated invertebrate, insect, seed, and other plant matter used as animal feed particles 132 can have a moisture content of less than 12%, 10%, 8%, 6%, 4%, or even 3%, which can be similar to or different than the moisture content of other types of animal feed particles 132 in the feed mixture 130.

The seed butter 134 coating each of the plurality of animal feed particles 132 generally is in the form of a puree or paste such that the seed butter 134 can provide a slight binding force on the animal feed particles 132. The seed butter 134 is generally no more than 20% of the feed mixture 130 by weight. In some embodiments the seed butter 134 is no more than 15% or even 10% of the feed mixture 130 by weight. In various embodiments the seed butter 134 is at least 3% or at least 5% of the feed mixture 130 by weight. The seed butter 134 generally has a moisture content of less than 6%, 4% or even 2%. In some embodiments the seed butter 134 has a moisture content of less than 1%.

The seed butter 134 is formed from ground, crushed, pressed, macerated, or puréed seed. A variety of types of seeds can be used to make the seed butter such as sunflower seeds, peanuts, soybeans, flax, pulses, tree nuts, and the like. In some embodiments the seed butter is SunButter®, which is manufactured by SunButter LLC based in Fargo, N. Dak. In some other embodiments the seed butter is peanut butter or almond butter. In a number of embodiments the seed butter is a mixture of multiple types of seed butters.

The seed butter 134 is generally at least 30% fat content by weight and generally no more than 55% fat content by weight. In some embodiments, the fat content of the seeds used to create the seed butter is about equal to the fat content of the seed butter. In other embodiments, particularly if the fat content of the seeds used to make the seed butter is less than 30% by weight, supplemental fat can be added during manufacturing of the seed butter to achieve the 30%-55% fat content by weight. The supplemental fat can be seed oil, suet, or shortening, as examples. In such embodiments it can be desirable to homogenize the seeds and the supplemental fat to achieve a substantially homogenous seed butter 134. Furthermore, if the fat content of the seed butter 134 is above 55% by weight, the seed butter 134 would need to be homogenized to prevent the oils from separating.

In a variety of embodiments the seeds used to manufacture the seed butter 134 can be roasted before forming the seed butter 134. Roasting the seeds can enhance, as examples, the smell, flavor, and color of the seed butter 134 and, therefore, the resultant animal feed mixture 130 incorporating such seed butter 134. As an example, the relatively pleasant smell of a seed butter 134 formed from roasting the constituent seeds can counteract relatively unpleasant smells associated with animal feed particles such as dehydrated invertebrates and/or insects. Roasting can also reduce the amount of moisture in the seed butter 134.

As mentioned above, the container 110 generally defines a cavity 120 that contains the feed mixture 130. The container 110 can have a variety of different configurations and can be constructed of a variety of different materials and combinations of materials. In some embodiments, the container 110 is constructed of paper or cardboard. The paper can be recycled, recyclable, and/or compostable paper or cardboard. In some embodiments, the container 110 is constructed of a plastic such as a recycled, recyclable or/or compostable plastic. In some embodiments the container 110 is constructed of peat or other vegetable matter. While the container 110 is depicted as having a bowl shape in the current figures, the container can be molded or otherwise formed to have alternate shapes, including ornamental shapes. The container 110 defines a rim region 114 around an opening 112 in communication with the cavity 120. The removable cover 140 is coupled to the rim region 114 to isolate the opening 112 and the cavity 120 from the environment outside the container 110.

The removable cover 140 can be constructed of a variety of different materials and combinations of materials. In some embodiments, the removable cover 140 is a heat-shrink film. In some embodiments, the removable cover 140 is a sheet of paper or cardboard. The removable cover 140 can be coupled to the container 110 with an adhesive, such as an adhesive film/web or an adhesive paste. The adhesive can be a pressure-sensitive adhesive, heat activated adhesive, chemically-activated adhesive, and the like. In some embodiments, including the one depicted, the removable cover 140 can define a tab 142 that extends outward from the rim region 114. The tab 142 can be configured to be grasped by a user for removing the removable cover 140.

Figure 3:
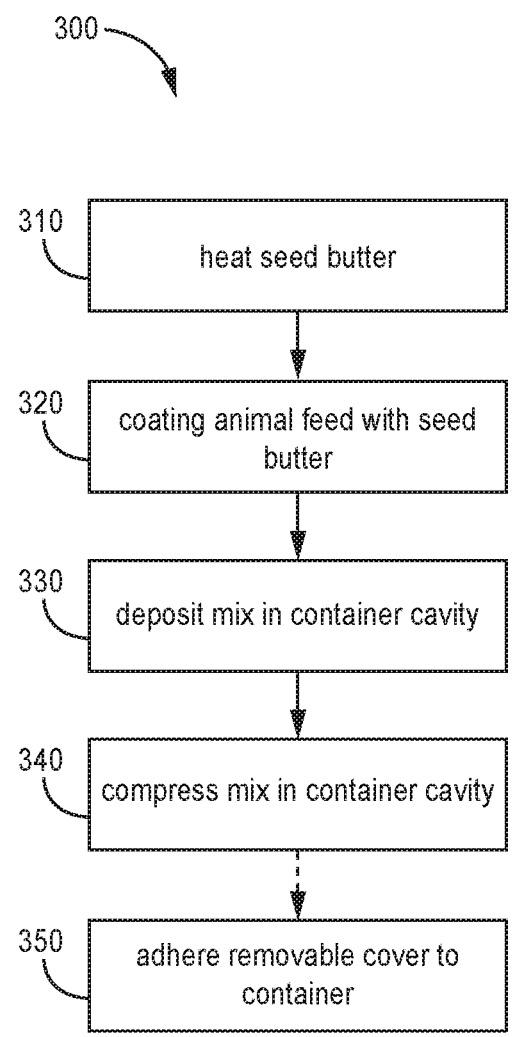
FIG. 3 depicts a flow chart of an example method consistent with embodiments of the technology disclosed herein.

There are a variety of different manufacturing methods and processing steps that are consistent with embodiments of the technology disclosed herein. FIG. 3 is one example flow chart. In this example embodiment the seed butter is heated 310 and animal feed particles are coated with seed butter 320. The feed mixture is deposited in a container cavity 330 and the feed mixture is compressed in the container cavity 340.

The seed butter can be consistent with seed butters described above in the discussions of FIGS. 1 and 2. The seed butter is generally heated 310 to reduce the viscosity of the seed butter to properly coat the animal feed particles 320. The particular temperature that the seed butter is heated to can depend on the type of seeds in the seed butter, the type of fats in the seed butter, and the particular manufacturing equipment used for coating the animal feed particles 320. The seed butter is generally heated 310 above ambient temperature until it forms a liquid and then the animal feed particles are coated with the seed butter 320.

The animal feed particles can be consistent with animal feed particles discussed above with reference to FIGS. 1 and 2. The animal feed particles can be coated with the seed butter 320 through a variety of different approaches and combinations of approaches. In embodiments, the heated seed butter is drizzled on the animal feed particles and mixed thoroughly with a mixer. The heated seed butter and the animal feed particles can be layered and then mixed. In some embodiments, some constituents of the animal feed particles, such as dehydrated invertebrates and/or insects, can be added after mixing some other of the constituents of the animal feed particles and heated seed butter. Such a step can be desirable to limit fragmenting and/or disintegration of the later-added constituents under the forces of the mixer.

Another example approach to coating the animal feed particles with the seed butter 320 is depicted in FIG. 4. In this example, the animal feed particles are translated through a spraying region 322, the seed butter is sprayed on the animal feed particles 324 in the spraying region to form a feed mixture, and the feed mixture is mixed 326.

In various embodiments the animal feed particles are translated through the spraying region 322 and the seed butter is sprayed on such particles 324 in the spraying region generally simultaneously. The spraying region is generally an area in space that receives the spraying heated seed butter and that the animal feed particles translate through. In some embodiments the animal feed particles are dropped such that the force of gravity translates the animal feed particles through the spraying region 322. In another example embodiment, the animal feed particles translate through a spraying region on a conveyor belt. Other approaches can also be used to translate the animal feed particles through the spraying region 322.

The heated seed butter can be sprayed on the animal feed particles 324 in the spraying region using a variety of different types of equipment and combinations of equipment. In one embodiment the heated seed butter is sprayed through a spray nozzle, a spin spray coater, and/or using an ultrasonic spray coater. In one example, a Mistcoater Liquid Applicator manufactured by Automated Process Equipment Corporation based in Lake Odessa, Mich. is used to spray the heated seed butter on the animal feed particles 324. In some embodiments the spray coater is also configured to heat the seed butter 310 (FIG. 3) prior to spraying the seed butter on the animal feed particles 324 (FIG. 4). In such embodiments, the seed butter will have been heated 310 to achieve a viscosity sufficient to pass through spraying equipment to be sprayed onto the animal feed particles 324.

Generally the heated seed butter is sprayed such that each of the animal feed particles are coated with seed butter. The animal feed particles can be coated with seed butter at least on one side of each of the particles. The seed butter-coated animal feed particles can be referred to as a feed mixture. The amount of seed butter sprayed on the animal feed particles is generally consistent with the amounts described above in the discussion of FIGS. 1 and 2.

In some, but not all embodiments, the feed mixture is mixed 326 after the animal feed particles have been sprayed with seed butter 324. Mixing the feed mixture 326 can further distribute the seed butter coating over the surfaces of the animal feed particles. Mixing the feed mixture 326 can create a homogenous seed butter coating over a substantial portion of the animal feed particles. In one example the feed mixture is passed through a mixer that mixes the feed mixture 326. The mixer can be a ribbon mixer, a paddle mixer, a tumbler, or other types of mixers. In some embodiments mixing the feed mixture 326 can be omitted, however. In other embodiments, the mixing 326 is executed before depositing the feed mixture in the container cavity 330 (FIG. 3).

Returning again to FIG. 3, the feed mixture is generally deposited into a container defining a cavity 330. The container can be consistent with containers discussed above with reference to FIGS. 1 and 2. The feed mixture can be deposited into a container cavity with depositor equipment, in various embodiments. Once the feed mixture is deposited in the container cavity 330, the feed mixture can be compressed in the cavity 340. The feed mixture is compressed in the cavity 340 with sufficient pressure to cause the feed mixture to substantially conform to the shape of the cavity. Further, the feed mixture is compressed in the cavity 340 with sufficient pressure to bind coated animal feed particles to abutting animal feed particles in the cavity. Generally the pressure applied to the feed mixture in the cavity is no more than 10 psi. In various embodiments the pressure applied to the feed mixture in the cavity is no more than 7 psi. In some embodiments the pressure applied is less than or equal to 3 psi, 4 psi, or even 5 psi. In some embodiments the pressure applied is greater than or equal to 0.25 psi, 0.5 psi, or even 1 psi.

In some embodiments, a removable cover is adhered to the container 350. Adhering the removable cover to the container 350 encases the feed mixture between the container and the removable cover. The removable cover can be adhered to a rim region defined by the container, which is described above with reference to FIGS. 1 and 2. The removable cover can be constructed of materials described above with reference to FIGS. 1 and 2.

The technology disclosed herein can have a variety of advantages. For example, in manufacturing, there is generally a relatively short period of time between depositing the feed mixture in the container cavity 330, compressing the feed mixture in the container cavity 340 and adhering the removable cover to the container 350. Generally the removable cover can be adhered to the container 350 as soon as the seed butter sufficiently cools. In some embodiments the seed butter is sufficiently cooled when it reaches a temperature of 75° F. or less, or 70° F. or less. Little to no drying time is required to allow moisture to evaporate from the feed mixture because moisture is not added to the feed mixture during the manufacturing process.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. An animal feed product comprising:
   a container defining a cavity;
   a feed mixture disposed in the cavity, the feed mixture comprising:
      a plurality of animal feed particles comprising a plurality of seeds; and seed butter coating each of the plurality of animal feed particles, wherein the seed butter is no more than 20% of the feed mixture by weight; and a removable cover coupled to the container over the cavity, wherein the removable cover and the container encase the feed mixture.

2. The animal feed product of claim 1, wherein the animal feed particles further comprises at least one in the group consisting of: a plurality of dehydrated invertebrates and a plurality of dehydrated insects.

3. The animal feed product of claim 2, wherein the plurality of dehydrated invertebrates comprises at least one in the group consisting of: mealworms and black soldier fly larvae.

4. The animal feed product of claim 1, wherein the plurality of seeds comprise at least one type of seed in the group consisting of: sunflower, grain, legume, and grass.

5. The animal feed product of claim 1, wherein the seed butter comprises sunflower seed butter.

6. The animal feed product of claim 1, wherein the seed butter contains at least one type of seed in the group consisting of: peanuts, tree nuts, soybeans and pulses.

7. The animal feed product of claim 1, wherein the container comprises paper.

8. The animal feed product of claim 1, wherein the removable cover comprises a heat-shrink film coupled to the container with adhesive about the cavity.

9. The animal feed product of claim 1, wherein the seed butter is no more than 15% of the feed mixture by weight.

10. The animal feed product of claim 1, wherein the plurality of seeds comprise at least one in the group consisting of: whole seeds and partial seeds.

11. The animal feed product of claim 1, wherein the animal feed particles further comprise one in the group consisting of: dehydrated vegetables, dehydrated fruit, and dehydrated herbs.

12. The animal feed product of claim 1, wherein the seed butter has 30% to 55% fat content.

13. A method comprising:
heating a seed butter resulting in reducing the viscosity of the seed butter;
translating animal feed particles comprising a plurality of seeds through a spraying region;
spraying the animal feed particles with the heated seed butter in the spraying region, thereby coating each of the animal feed particles with the seed butter to form a feed mixture, wherein the seed butter is no more than 20% of the feed mixture by weight;
depositing the feed mixture into a container defining a cavity;
compressing the feed mixture in the cavity; and
adhering a removable cover to the container about the cavity, thereby encasing the feed mixture.

14. The method of claim 13, further comprising mixing the feed mixture before depositing the feed mixture in the container.

15. The method of claim 13, wherein compressing the feed mixture in the container comprises applying a pressure of no more than 10 psi.

16. The method of claim 13, wherein the plurality of seeds comprise at least one type of seed in the group consisting of: sunflower, grain, legume, and grass.

17. The method of claim 13, wherein the animal feed particles comprises one in the group consisting of: a plurality of dehydrated invertebrates and a plurality of dehydrated insects.

18. The method of claim 17, wherein the invertebrates comprise one in the group consisting of: mealworms and black soldier fly larvae.

19. The method of claim 13, wherein the seed butter has 30% to 55% fat content.

20. The method of claim 13, wherein the animal feed particles further comprise at least one in the group consisting of: dehydrated vegetables, dehydrated fruit, and dehydrated herbs.

* * * * *